United States Patent

Mangold

(10) Patent No.: US 9,457,695 B2
(45) Date of Patent: Oct. 4, 2016

(54) CARRIER STRUCTURE FOR AN ARMREST OF A VEHICLE

(71) Applicant: AUDI AG, Ingolstadt (DE)

(72) Inventor: Steffen Mangold, Stödtlen (DE)

(73) Assignee: AUDI AG, Ingolstadt (DE)

( * ) Notice: Subject to any disclaimer, the term of this patent is extended or adjusted under 35 U.S.C. 154(b) by 39 days.

(21) Appl. No.: 14/395,331

(22) PCT Filed: Mar. 21, 2013

(86) PCT No.: PCT/EP2013/000859
§ 371 (c)(1),
(2) Date: Oct. 17, 2014

(87) PCT Pub. No.: WO2013/156102
PCT Pub. Date: Oct. 24, 2013

(65) Prior Publication Data
US 2015/0115682 A1 Apr. 30, 2015

(30) Foreign Application Priority Data

Apr. 19, 2012 (DE) .......................... 10 2012 007 845

(51) Int. Cl.
*B60N 2/46* (2006.01)
*B21D 53/88* (2006.01)

(52) U.S. Cl.
CPC ........... *B60N 2/4606* (2013.01); *B60N 2/4626* (2013.01); *B21D 53/88* (2013.01)

(58) Field of Classification Search
CPC .... B60N 2/46; B60N 2/4606; B60N 2/4626; B60N 2/68; B21D 53/88
See application file for complete search history.

(56) References Cited

U.S. PATENT DOCUMENTS

2016/0031345 A1* 2/2016 Kuhley ................ B60N 2/4606
297/411.31

FOREIGN PATENT DOCUMENTS

| EP | 0518358 A1 | 12/1992 |
| FR | 2954242 A1 | 6/2011 |
| JP | 2000 051960 A | 2/2000 |
| JP | 2000 158053 A | 6/2000 |
| JP | 2010 221939 A | 10/2010 |

OTHER PUBLICATIONS

International Search Report issued by the European Patent Office in International Application PCT/EP2013/000859.

* cited by examiner

*Primary Examiner* — Glenn Dayoan
*Assistant Examiner* — Melissa A Black
(74) *Attorney, Agent, or Firm* — Henry M. Feiereisen LLC

(57) ABSTRACT

A carrier structure for an armrest for pivotal articulation to a mount in a vehicle includes two carrier arms carrying a support body, wherein the carrier arms are connected at one end to a cross member. The cross member has pins for pivotable support in the mount. The cross member is produced by tube forming, bending and punching of a steel sheet corresponding substantially to the planar projection of the cross member, wherein the pins are formed on the cross member as tube parts.

8 Claims, 6 Drawing Sheets

US 9,457,695 B2

CARRIER STRUCTURE FOR AN ARMREST OF A VEHICLE

CROSS-REFERENCES TO RELATED APPLICATIONS

This application is the U.S. National Stage of International Application No. PCT/EP20131000859, filed Mar. 21, 2013, which designated the United States and has been published as International Publication No. WO 2013/156102 and which claims the priority of German Patent Application, Serial No. 10 2012 007 845.5, filed Apr. 19, 2012, pursuant to 35 U.S.C. 119(a)-(d).

BACKGROUND OF THE INVENTION

The invention relates to a carrier structure for an armrest for pivotable articulation to a mount of a vehicle.

When swingable center armrests of a vehicle, in particular of a motor vehicle, are involved, the support body, which serves as a padding for placement of the forearms of a vehicle occupant, is carried by carrier arms of a carrier structure which is swingably hinged to a mount of the vehicle.

Such a carrier structure 23 for a center armrest 20 articulated to a mount 30 of a rear-seat bench of a motor vehicle is shown in FIG. 9 in a view from below onto the center armrest 20. This carrier structure 23 includes a cross member 24 which consists of a rectangular frame of two solid round bars 24a and 24b which extend in parallel relation to a pivot axis A and have ends which are connected by bars 27a and 27b and transition into two carrier arms 23a and 23b. The carrier arms 23a and 23b are connected in the central region thereof by a transverse strut 22. These carrier arms 23a and 23b carry the substructure 21b of a support body 21a of the armrest 20.

The bars 27a and 27b carry each a pivot bearing 25a and 25b to provide a pivotable support of the carrier structure 23 in the mount 30. Furthermore, the round bar 24b is guided beyond the bars 27a and 27b for the formation of a stop pin 26a and 26b. These stop pins 26a and 26b interact jointly with a crash pendulum (not illustrated) and a catch hook support 28 for blocking an uncontrolled pivoting of the armrest 20.

The carrier arms 23a and 23b are made of a tubular profile, while the round bars 24a and 24b of the cross member 24 are made of solid material and connected by welding with the cross member 24. Such a carrier structure 23 of steel has the required stability to absorb all encountered forces and moments. However, a disadvantage is the high weight and the associated manufacturing costs of such a carrier structure 23.

SUMMARY OF THE INVENTION

Object of the invention is therefore to provide a carrier structure for a pivotable armrest, in particular a center armrest for a vehicle, that allows a stable connection of the carrier structure of the armrest to the console of the vehicle while having low weight and low manufacturing costs.

This object is attained by a carrier structure for an armrest for pivotable articulation to a mount in a vehicle, including two carrier arms carrying a support body, wherein the carrier arms are connected at one end to a cross member, and the cross member has pins for pivotable support in the mount, wherein the cross member is produced by tube forming, bending and punching from a steel sheet corresponding substantially to the planar projection of the cross member, wherein the pins are formed on the cross member as tube parts.

Such a carrier structure for an armrest for pivotable articulation to a mount of a vehicle includes two carrier arms carrying a support body, with the carrier arms being connected at one end to a cross member and the cross member having pins for pivotable support in the mount, and is characterized according the invention in that the cross member is produced by tube forming, bending and punching of a steel sheet corresponding substantially to the planar projection of the cross member, with the pins being formed as tube parts onto the cross member.

This carrier structure according to the invention enables a substantial weight reduction compared to the known carrier structure according to FIG. 9, without accepting drawbacks in terms of the strength and stiffness of the carrier structure. A further advantage is that the production of this carrier structure by tube forming, bending and punching is also more cost-effective in comparison to a production of a cross member of solid material. The tubes required for the pivotable support can also be formed with an internal thread so that the components necessary for the pivotable support can be threadably attached.

According to an advantageous configuration of the invention, the cross member is cuboid in shape with side panels that form an outer surface area and opposing base panels, with an end of the carrier arms and at least a tube part being respectively formed on the base panels. Such a cuboid cross member, which for example, can be designed in a flat shape, is able to realize the strength and stiffness required for a swingable armrest.

According to an advantageous refinement of the invention, the cross member is formed with base panels which, in the planar projection, have free edges which form a gap with the adjacent edges of the side panels for formfittingly receiving the carrier arms. Thus, both the carrier arms with the cross member and the cross member in its shape as cuboid are at the same time completed to increase stiffness, as both base panels of the cross member are connected via the carrier arms with the remaining side panels of the casing of the cross member. Preferably, dimensioning and shape of the gap conforms to the contour of the carrier arms, in particular at their end portions, in order to establish a formfitting connection between the involved components.

According to a further configuration of the invention, two opposite side panels of the cross member have each in the center region along a longitudinal centerline a recess, thereby realizing a weight reduction without reducing the stiffness of the cross member.

It is particularly advantageous when, according to a refinement of the invention, the cross member has a side panel which extends in parallel relation to the plane spanned by the longitudinal members and is formed, at least partially, with an inwardly directed bulge. This increases the stiffness and strength of the cross member. It is hereby preferred to configure the side panel provided for the bulge with marginal webs adjacent to the base panels in such a way that the area between the marginal webs is formed as a bulge. This makes it possible to provide additional space for further components of the armrest, without reducing the stiffness and strength of the carrier structure.

According to a further configuration of the invention, a further tube part is formed on each of the end faces of the base panels of the cross member as receiving mandrel for limiting an uncontrolled pivotal movement of the carrier structure in relation to the vehicle-side mount. A crash pendulum for example interacts with this additional tube part.

According to a refinement, the carrier arms to be connected with the cross member can be manufactured from a flattened tube in order to enable a connection with the cross member by a welded joint.

As an alternative, the carrier arms can be formed according to another configuration of the invention as a double sheet metal part with two parallel sheet metal parts, which are connected at the free end of the carrier arm and connected on the cross-member side to the cross member by a welded joint. As a result, the total weight of the carrier structure can be further reduced with such carrier arms.

An exemplary embodiment of the invention will now be described in greater detail with reference to the accompanying drawings. It is shown in:

DETAILED DESCRIPTION OF PREFERRED EMBODIMENTS

Figure 1:
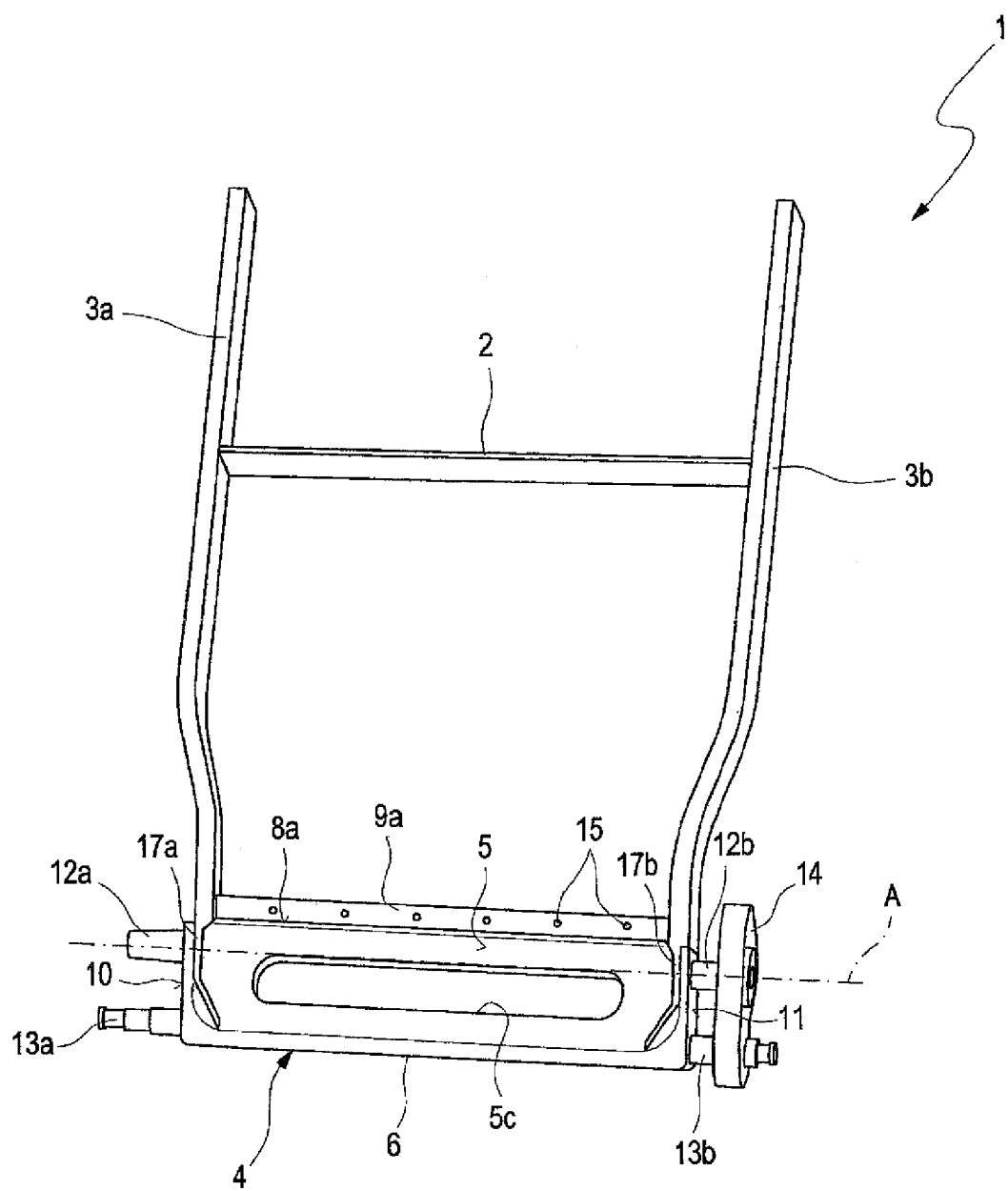
FIG. 1 a perspective illustration of a carrier structure for an armrest according to the invention, FIG. 2 a perspective illustration of a cross member of the carrier structure of FIG. 1 in a first view, FIG. 3 a perspective illustration of a cross member of the support structure of FIG. 1 in a second view, FIG. 4 a perspective illustration of a cross member of the carrier structure of FIG. 1 in a third view, FIG. 5 a principal sketch of a planar projection of the cross member according to FIG. 2, FIG. 6 a view of a base panel of the cross, member according to FIG. 2, FIG. 7 a sectional view of the cross member taken along section I-I in FIG. 4, FIG. 8 a detailed perspective illustration of a cross member according to the invention with a carrier arm made from a double sheeted metal part, and FIG. 9 a perspective illustration of an armrest with a carrier structure according to the prior art.

The carrier structure 1 of the invention according to FIG. 1 for receiving an armrest body (not shown) for formation of a swingable armrest of a vehicle includes a cross member 4, to which two carrier arms 3a and 3b are welded that are connected in addition in midsection via a transverse strut 2. The cross member 4 is articulated to a mount (not shown) of the vehicle via two pivot bearings 12a and 12b for swinging about a pivot axis A. Two further receiving mandrels 13a and 13b are also formed on the cross member 4, with the receiving mandrel 13b interacting with a crash pendulum 14 in order to prevent the armrests from swinging open uncontrollably in the presence of high accelerations of the vehicle. Such crash pendulums are known to the artisan and therefore will not be explained hereinafter in more detail.

Figure 2:
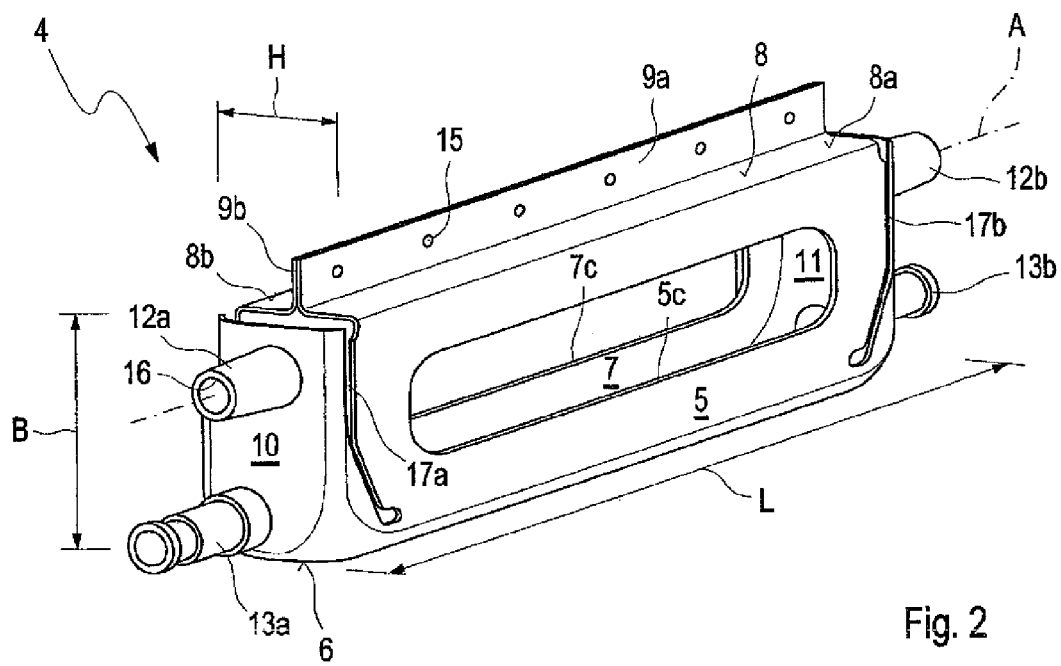
Figure 3:
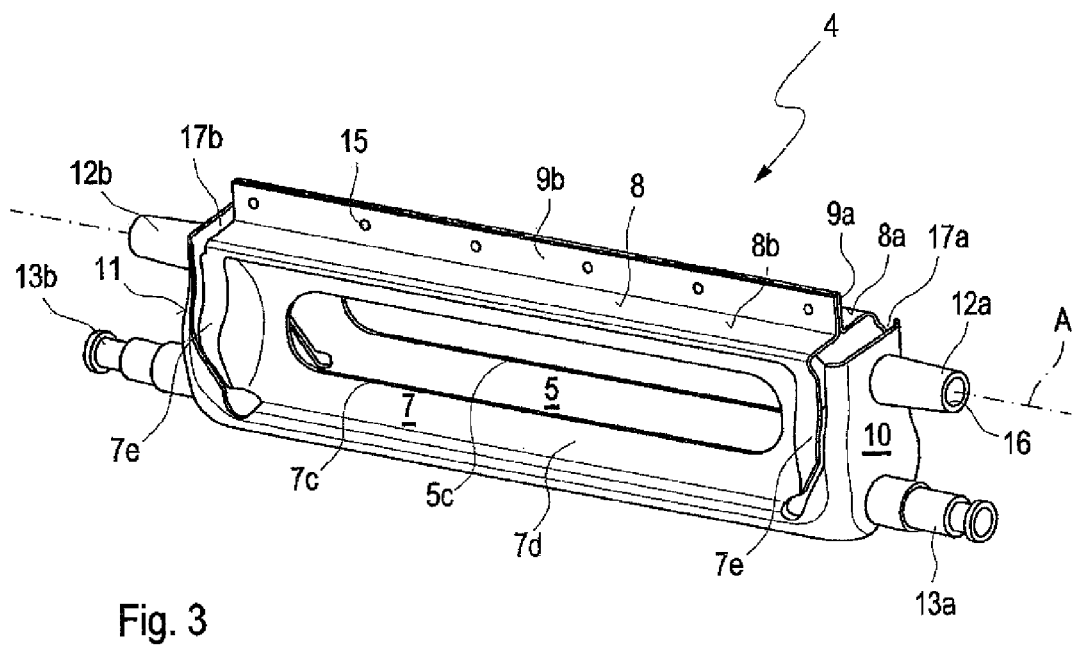
Figure 4:
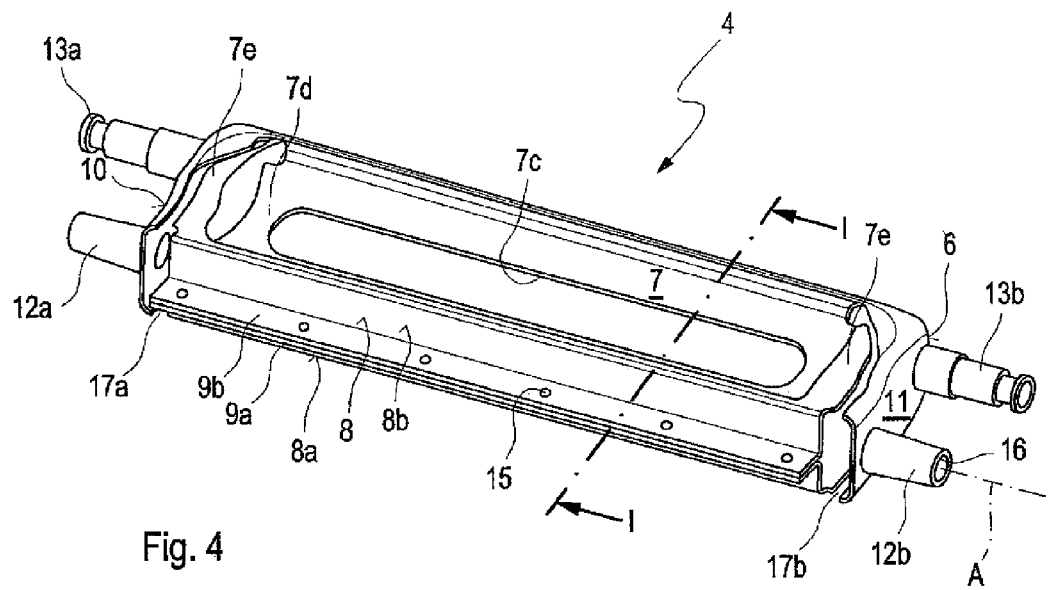
Figure 6:
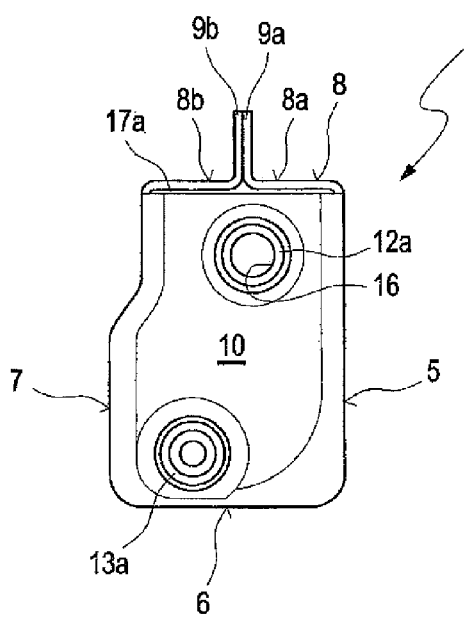
Figure 7:
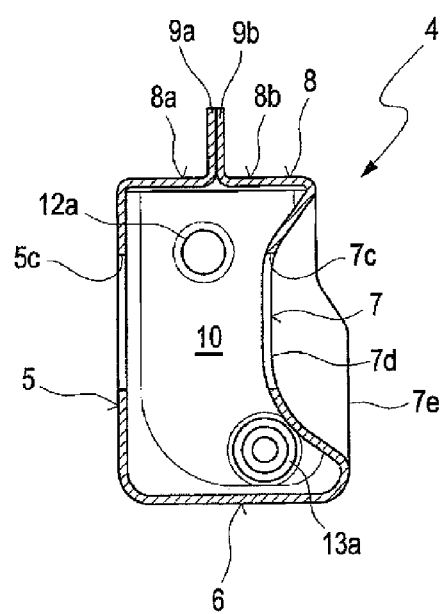

The FIGS. 2, 3 and 4 show the cross member 4 in different perspective views from which its cuboid shape becomes apparent. This cuboid cross member 4 is made from a flat steel plate, which is formed substantially as planar projection of its cuboid configuration, by tube forming, bending and punching. This planar projection is illustrated in principle in FIG. 5, which has side panels 5, 6, 7 and 8 to form the outer surface area of the cross member 4, and two base panels 10 and 11, which form the end faces of the cuboid configuration. The side panel 8 includes, according to FIG. 5, two sub-areas 8a and 8b having each a fishplate 9a and 9b that are angled perpendicular to the end face 8, when the cross member has been completely produced, and flatly rest on one another so as to be connectable, e.g., by welding spots 15.

Further, its flat shape becomes apparent from FIGS. 2 to 4, 6 and 7; i.e. the width B is substantially greater than the height H of the cross member 4.

Figure 5:
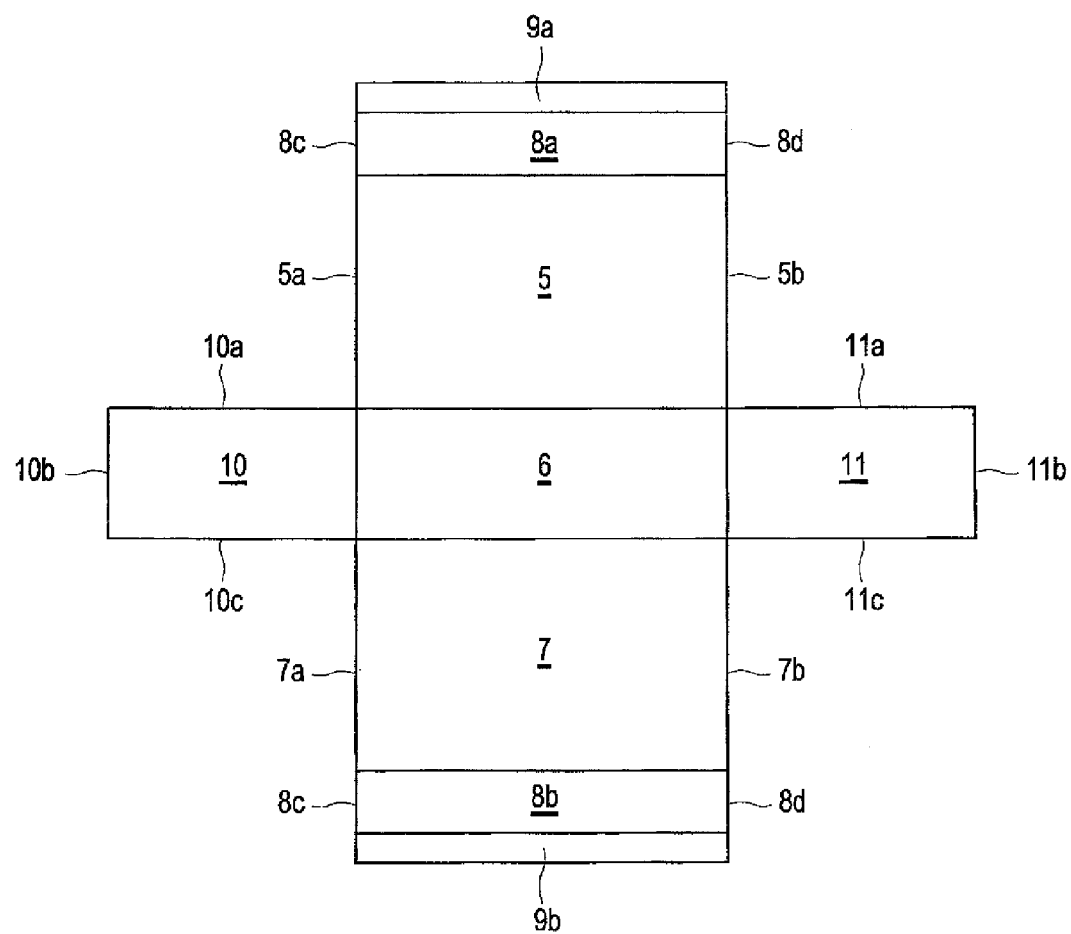

The cross member 4 is produced as sheet metal forming part by several process steps from the planar projection according FIG. 5 through punching, tube forming and bending. Accordingly, elongate recesses 5c and 7c are initially produced in the side panels 5 and 6 as cutouts. Furthermore, an inwardly directed bulge 7d is impressed in the side panel 7, with the bulge extending about an axis in longitudinal direction in correspondence with the pivot axis A of the cross member 4. This bulge 7d does hereby not extend over the entire length L of the cross member 4, but a marginal web 7e remains at each of the edges 7a and 7b of the side panel 7, as can be seen in FIG. 3 and the sectional view of FIG. 7.

A pivot bearing 12a and 12b as well as a receiving mandrel 13a and 13b are produced in each of the base panels or end faces 10 and 11, with a thread 16 being also cut into the pivot bearings 12a and 12b.

The thus-prepared planar projection is brought by several bending steps into the shape according to FIGS. 2 to 4, 6 and 7, with the end faces 10 and 11 being processed such that their free edges 10a, 10b and 10c and 11a, 11b and 11c in the planar projection do not bear upon the edges 5a and 5b and 7a and 7b of the side panels 5 and 7, respectively, i.e. also not upon the edges 8c and 8d of the sub-areas 8a and 8b, but a respective gap 17a and 17b remains and extends along the free edges 10a, 10b and 10c and 11a, 11b and 11c of the end faces 10 and 11, respectively. This gap 17a, 17b receives the end of the carrier arm 3a and 3b, respectively, and is formfittingly connected through welding with the cross member 4, i.e. with the side panels 5, 7 and 8 as well as with the end face 10 and 11, respectively. The participating edges of these side panels 5, 7 and 8 as well as the end faces 10 and 11 are contoured according to the geometry of the end regions of the carrier arms 3a and 3b. The thus-produced carrier structure 1 is shown in FIG. 1. The used carrier arms 3a and 3b represent flattened tubes.

Figure 8:
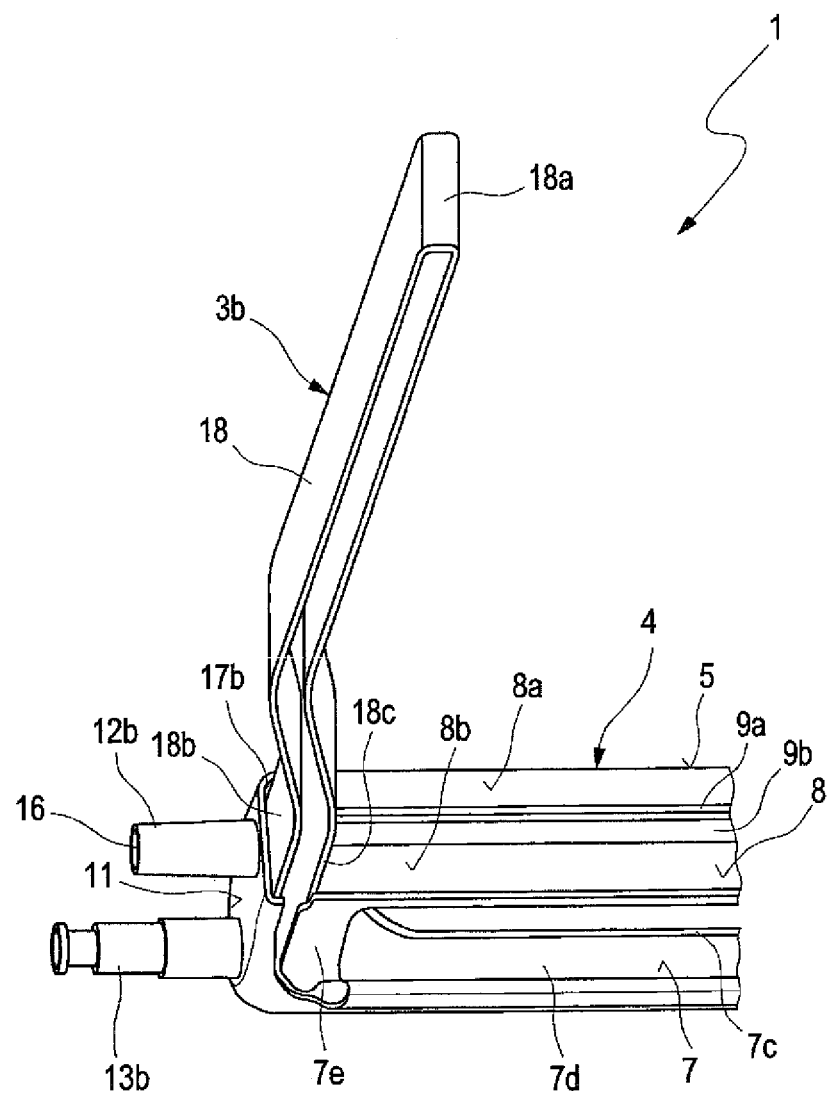
Figure 9:
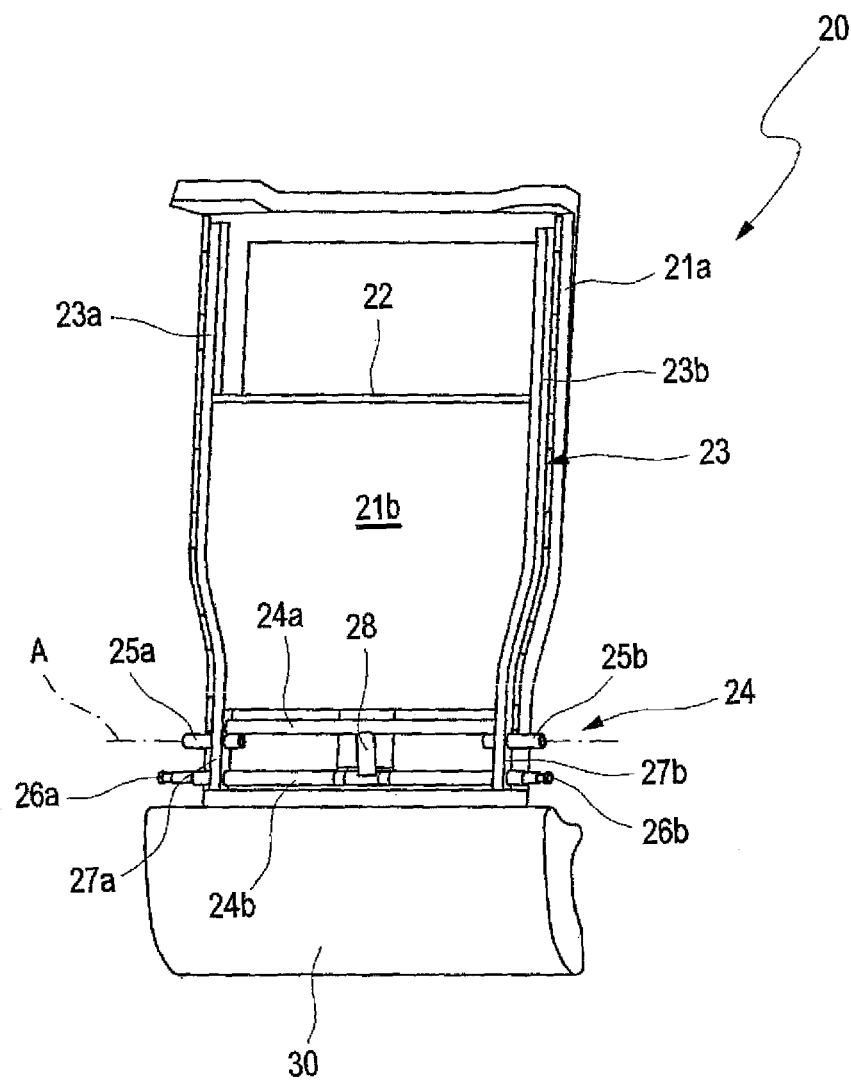

The flattened tubes as carrier arms 3a and 3b used in the carrier structure 1 according to FIG. 1 may also be replaced by a double sheet metal part, as shown in FIG. 8. This double sheet metal part is manufactured from a sheet metal strip 18 which is folded once at a bending site 18a forming the end of the carrier arm 3b. The free ends 18b and 18c of this sheet metal strip 18 are inserted in gap 17b and welded with the edges 11a, 11b and 11c and the edges 5b and 7b of the side panels 5 and 7.

Production costs can be reduced with this solution compared to the use of flattened tubes as the carrier arms 3a and 3b since the use of such flattened tubes is relatively expensive. Furthermore, a carrier structure 1 produced in this way has also reduced weight.

The invention claimed is:

1. A carrier structure for an armrest for articulation to a mount of a vehicle, said carrier structure comprising:
   a cross member having pins, formed on the cross member as tube parts, for pivotable support in the mount, said cross member being made of a steel sheet undergoing tube-forming, bending and punching of a steel sheet to assume a shape substantially corresponding to a planar projection of the cross member; and two carrier arms configured to carry a support body and connected at one end to the cross member, said cross member having a cuboid configuration to define side panels forming an outer surface area, and opposing base panels having free edges which in the planar projection form a gap with adjacent edges of the side panels for formfittingly receiving an end of the carrier arms.

2. The carrier structure of claim 1, wherein the gap is defined by a dimension and shape to complement a contour of the carrier arms.

3. The carrier structure of claim 1, wherein two of the side panels of the cross member oppose one another and comprise each a recess in a central region along a longitudinal centerline.

4. The carrier structure of claim 1, wherein at least one of the side panels of the cross member extends in parallel relation to a plane spanned by the carrier arms and is formed, at least partially, with an inwardly directed bulge.

5. The carrier structure of claim 4, wherein the at least one side panel is formed with marginal webs adjacent to the base panels such that the bulge is formed by a region between the marginal webs.

6. The carrier structure of claim 1, further comprising a further tube part formed on each of end faces of the base panels of the cross member as receiving mandrel for limiting an uncontrolled pivotal movement of the carrier structure in relation to the mount of the vehicle.

7. The carrier structure of claim 1, wherein the carrier arms are each made of a flattened tube and connected to the cross member by a weld joint.

8. The carrier structure of claim 1, wherein the carrier arms are formed as a double sheet metal part having two parallel sheet metal parts which are connected at a free end of the carrier arms and connected to the cross member by a weld joint.

* * * * *